Jan. 26, 1971 CARL-GUSTAF H. AF SEGERSTAD 3,557,632
DEVICE FOR REVERSING MOTIONS
Filed Sept. 11, 1968
3 Sheets-Sheet 1

INVENTOR
Carl Gustaf Hard af Segerstad.
BY
Mason, Porter, Diller & Brown
ATTORNEYS Jan. 26, 1971   CARL-GUSTAF H. AF SEGERSTAD   3,557,632
DEVICE FOR REVERSING MOTIONS
Filed Sept. 11, 1968                                       3 Sheets-Sheet 3

INVENTOR
Carl Gustaf Hard af Segerstad.
BY
Mason, Porter, Diller & Brown
ATTORNEYS

United States Patent Office 3,557,632
Patented Jan. 26, 1971

3,557,632
DEVICE FOR REVERSING MOTIONS
Carl-Gustaf Hard af Segerstad, Strandvagen 22,
Sandviken, Sweden
Filed Sept. 11, 1968, Ser. No. 759,095
Int. Cl. F16h 27/02
U.S. Cl. 74—129
14 Claims

ABSTRACT OF THE DISCLOSURE

This disclosure relates to a device for reversing the rotation of an output shaft, and includes a pair of gears drivably coupled to the output shaft, a drive gear, an intermediate gear between the pair of gears carried by the output shaft and the drive gear, means for imparting rotation to the drive gear in but a single direction, and means for selectively coupling the output gears individually with the intermediate gear to effect rotation of the output shaft in either of two directions. The output gears are carried by a sleeve coupled to the output shaft which is shifted by a bell crank under the influence of a reciprocal piston.

---

The main purpose of the invention is to provide a device capable of rotating a shaft, as desired, in one direction or in the opposite.

Another purpose of the invention is to provide a device as above described which is actuated by remote control.

An additional purpose of the invention is to arrange for remote controlled pressure impulses by pneumatic, hydraulic or electrical means which translate into mechanical motions designed to bring about the desired direction of rotation, speed, start and stop of the shaft being driven by the operating device.

A further purpose of the invention is to provide a driving device actuated by a pressure media which device can impart torque to the driven shaft, in a reciprocating manner by change in the direction of rotation of the shaft.

Keeping these and other purposes of the invention in mind, the following is a description of a preferred embodiment of the major features of the invention for which reference is made to the accompanying drawings in which—

Figure 2:
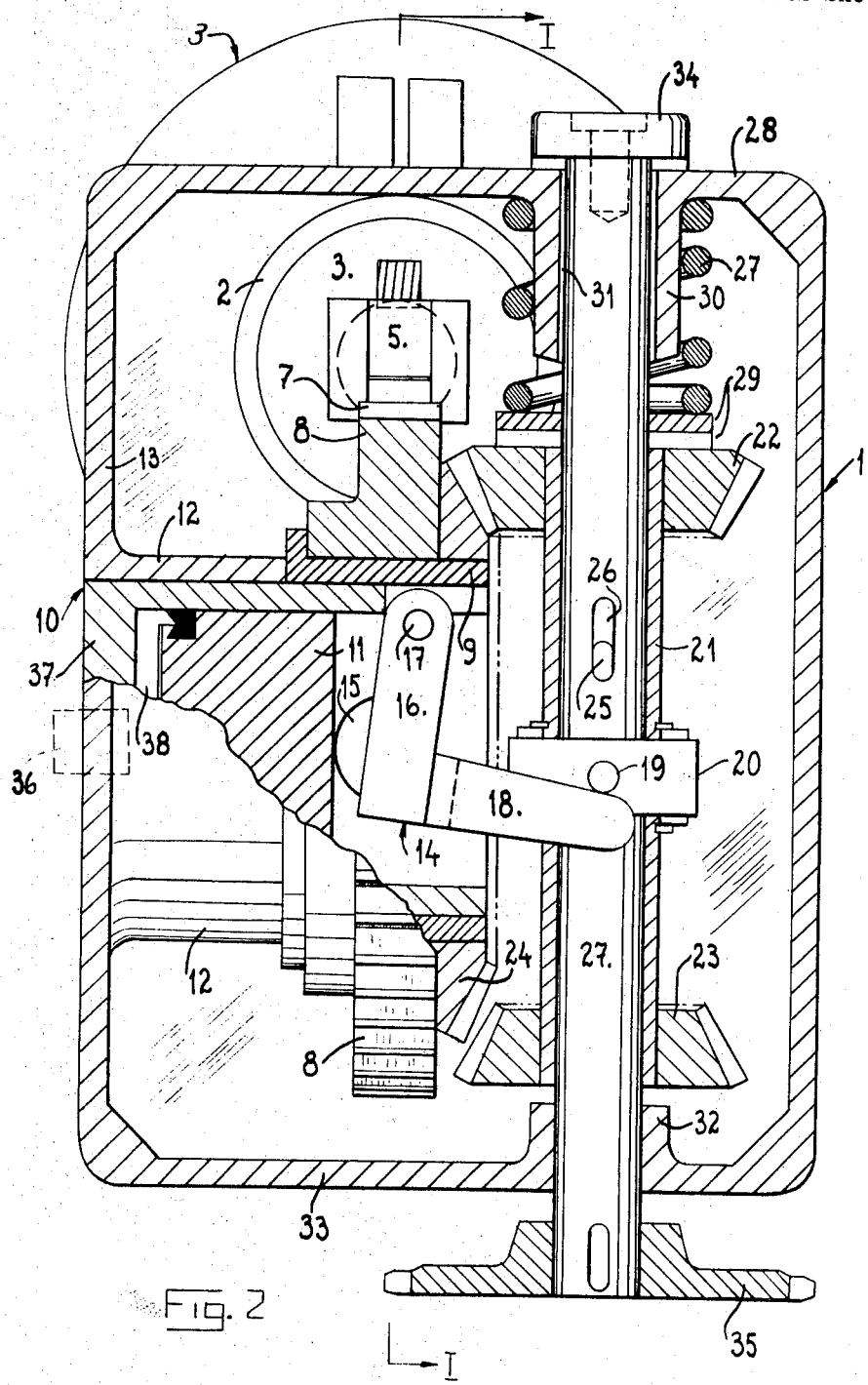
FIG. 2 is a cross-section view, chiefly along line II—II in FIG. 1.
Figure 1:
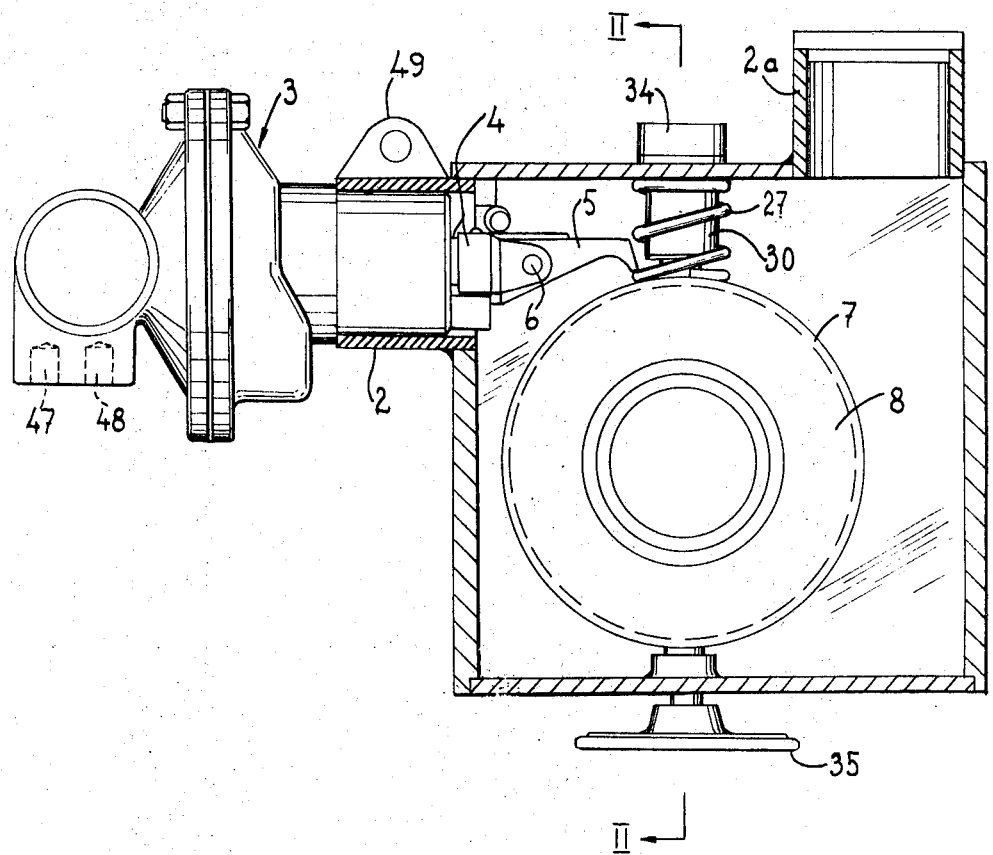
FIG. 1 represents a cross-section, chiefly along line I—I in FIG. 2.

The device as shown in FIGS. 1 and 2 has an outer housing 1 with two tubular members 2 and 2a attached which latter are designed to receive a motor or motors 3, 3a of a reciprocating type activating a member 4 to which is pivotally connected a ratchet 5 by means of a pin 6. The ratchet 5 is adapted to engage the cogs or teeth 7 along the circumference of a gear or cog wheel 8.

The motor 3 may be driven by means of a pressure media, by electric current, or by any other means. The motor(s) may be positioned on tubular member 2, 2a or in other similar mounting positions from which gear wheel 8 can be tangentially activated by the ratchet 5.

Gear wheel 8, is freely mounted and can rotate around a bearing sleeve 9 (FIG. 2) which in turn is mounted on the inner end of a cylindrical member 10 forming the cylinder for a piston 11. Member 10 is fastened by a pressure fit in a mounting socket 12 formed by a portion of wall 13 of housing 1.

The piston 11 moves freely in cylinder 10 but in engagement by pressure with a bell crank member 14 at its convex formation 15. One arm 16 of the bell crank is pivotally connected to the inner housing by means of a pin 17. The other arm 18 of the bell crank member is fork shaped with a concavely shaped seat receiving diametrically positioned pins 19 fastened to a sleeve 20. The sleeve 20, in turn, is freely positioned around a hollow shaft 21 in bearing seats which allow shaft 21 to rotate. The pivotal movement of bell crank 14 can lift or lower the hollow shaft 21 by means of sleeve 20 centered freely around it.

The hollow shaft 21 has affixed to it, opposed and at each end, bevel gear wheels 22 and 23 so spaced as to positively keep one or the other of wheels 22 and 23 out of engagement with a bevel gear wheel 24 affixed to the gear wheel 8, depending on whether the hollow shaft 21 is in its lower position or has been lifted to its upper position by bell crank 14 acting upon sleeve 20. The extreme lower and upper positions of shaft 21 is governed by a pin 25 fastened to sleeve shaft 21 which can move the length of an elongated slot 26 of a solid central axle 27 around which hollow shaft 21 can move up and down the distance of pin 25's movement in slot 26. When pin 25 reaches the lower position in slot 26, bevel gear 22 becomes engaged to bevel gear 24. In the opposite position bevel gear 23 becomes so engaged.

While axle 27 is affixed in its position lengthwise it is freely rotating with hollow shaft 21 by means of the coupling afforded by above described pin 25 which locks shaft 21 through the elongated slot 26 with axle 27 to a desired rotation in one direction or the other.

Shaft 21 is kept in its lowermost position as shown in FIG. 2 by means of a spring 28 compressed between the top wall of housing 1 and plates and washers 29 thrusting against gear wheel 22. The top wall of housing 1 has a socket extension 30 which forms a locating mounting for spring 27 as well as a holder for a bearing 31 for the upper end of axle 27. The lower end of axle 27 is in a similar manner received in a bearing 32 suitably seated in a socket which forms part of bottom wall 33 of the housing.

The upper end of axle 27 terminates in a head member 34 which serves to position the former relative to housing 1 and which can also be coupled to an indicator instrument showing number of turns of axle 27 in one direction or the other. One such indicator instrument is manufactured by Telektron Hard of Artillerigation 24, Box 14047, Stockholm 14, Sweden, and identified by catalogue No. PPT and PPT–U. At its lower end, which like head member 34 protrudes out of housing 1, axle 27 has a cog or chain wheel 35 affixed to it which forms the output, driving wheel.

Dotted line 36 designates a receptacle for a pipe or pressure tube through which a pressure medium can be transmitted from its source through wall 37 into cylinder 10. The pressure medium shall be able to drive piston 11 toward the bell crank 14 so as to force its forked arm 18 in a counter clockwise movement to lift sleeve 20 and with its hollow shaft 21 from engagement of bevel gear 22, against the prevailing pressure of spring 27, into engagement of bevel gear 23 with the motor driven gear 24. When the supply of pressure medium is interrupted, by a control valve, and the pressure is released from the cylinder space designated 38, the pressure exerted by spring 27 shall be fully sufficient to force hollow shaft 21 back into its original, lower position in which bevel gear wheel 22 becomes engaged with gear wheel 24. The spring pressure will force the bell crank 14 back in a clockwise direction and with it piston 11 toward wall 37 of the housing.

From the above description of the operating device it is clear that gear wheel 8 being driven always in one direction by a ratchet member of reciprocating motor(s) will be engaged to one or the other of the two counter positioned bevel gear wheels 22 and 23 at each end of hollow shaft 21 which latter, thereby, imparts rotation in one direction or the opposite to its center axle 27 with its output driving wheel 35. At rest motors 3 and 3a will lift their respective ratchet members out of engagement with gear or cogwheel 8 and with it bevel gear 24. It is then possible, therefore, to move the unit being driven by output drive wheel 35 manually and without hindrance from the operating device.

Figure 3:
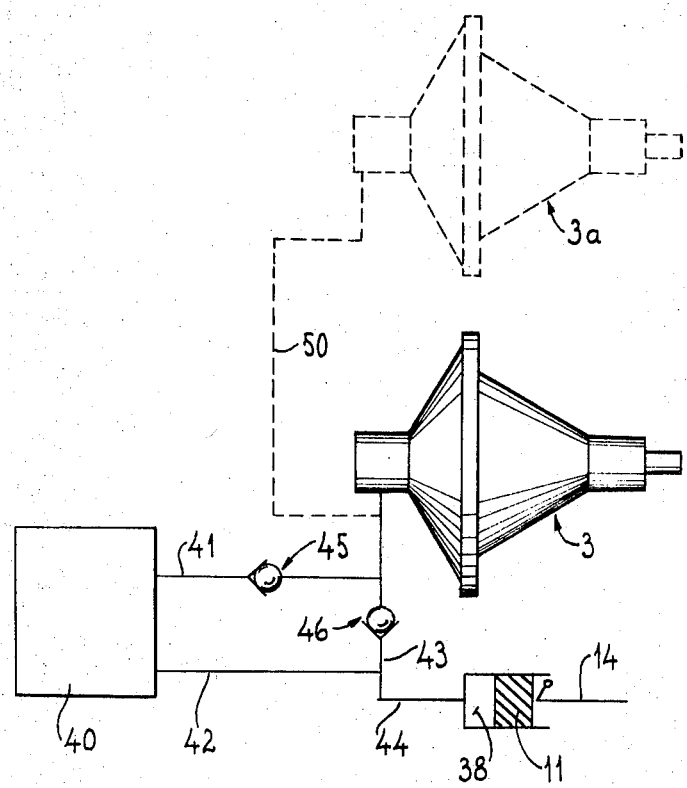
FIG. 3 represents a schematic illustration of a system for manoeuvring one or more of the devices illustrated in FIGS. 1 and 2.

Reference is now made to the schematic illustraion in FIG. 3. There we find again the already described cylinder member 10 with its piston 11 and cylinder space 38 as well as the diagrammatically shown bell crank member 14 and the motor 3. A possible supplementary motor is designated by 3a.

40 designates a control device by means of which it is possible to manually or automatically connect a pressure medium supply (not shown) to the motors 3 and 3a as well as to the cylinder space 38. There are two pressure medium pipe lines leading from the device 40 and designated by 41 and 42, respectively. The lines 41 and 42 are interconnected by a line 43. A line 44 connects the lines 42 and 43 with the cylinder space 38. The line 41 has incorporated into it a non-return valve 45, and the line 43 has likewise a non-return valve 46. The valve 45 is constructed to a low pressure medium to pass to the motors 3 and 3a and the valve 46 is adapted to a low pressure medium to pass from the line 42 to the motors 3 and 3a. Followingly, when line 41 is opened for pressure medium the motor or motors will be put into active operation, the valve 46 at the same time preventing any pressure impulse of reaching the cylinder space 38 through line 44. That means that all the parts shown in FIG. 2 will actually be in their positions indicated in FIG. 2. If, on the other hand, a pressure impulse is given through line 42 this impulse will without obstacles be transmitted into the cylinder space 38, resulting in a change of the positioned shown in FIG. 2 to the position where the wheels 23 and 24 are in mutual engagement. At the same time the valve 46 is allowing pressure impulses to reach the motor or motors 3 and 3a. Line 42 will release pressure through a release valve from cylinder space 38, when pressure is not fed from device 40.

From the above it will be readily understood that it is possible simply by manipulating the control device 40 to put the motor or motors into positive operation and, at the same time, to choose arbitrarily any desired direction of rotation of the output driving wheel 35.

The pressure medium may be a gaseous one or a liquid one, e.g. air or water. In FIG. 1 two connection recesses are indicated by dotted lines in the motor 3. The connection 47 may be for the pressure medium line in question, while the connection 48 may be for an exhaust line. Of course, 48 may also designate simply an outlet opening for the used pressure medium leaving the motor.

The reference character 49 may designate a means for clamping the motor 3 securely in the bracket socket 2.

In FIG. 3 the designation 50 means a pressure medium line connecting the motors 3 and 3a in parallel arrangement in respect of the pressure medium supply to them.

The control device may be of any electrical type maneuvered or operated by electrical impulses; it may also be of an electronic type, an electrical relay. The control device 40 may also be of a combined electrical or electronical, a pneumatical or hydraulical combination. This has a special reference to the manner in which the pressure medium is passed to the lines 41 and 42, but preferably the control device should be actuated by pneumatic impulses.

In the embodiment described and shown in the accompanying drawings the motors are, as mentioned before, of a reciprocating type driven by pressure medium and adapted always to drive the wheel 8 in one and the same direction as well as the wheel 24 affixed on to wheel 8.

Finally, it should be observed that the embodiment described and shown in the accompanying drawings is only presented as an example of the principle of the invention. Obviously, other embodiments are possible within the range of the invention, since many modifications and alterations will be obvious to the man skilled in the art after reading the above description and studying the drawings.

What is claimed is:

1. A device for reversing motions comprising rotatable drive means, means for imparting rotation to said drive means in but a single direction, output means selectively rotatable in either of two direction, first means between said rotatable drive means and said output means for drivingly coupling the same together to impart rotation to said output means in a first of said two directions, second means between said rotatable drive means and said output means for drivingly coupling the same together to impart rotation to said output means in a second of said two directions, and means for selectively separately coupling said first and second means to said rotatable drive means and said output means for effecting rotation of the latter in either of said two directions.

2. The motion reversing device as defined in claim 1 wherein said output means is a rotatable shaft, and said first and second means include gear means operably coupled to impart rotation to said shaft through said coupling means.

3. The motion reversing device as defined in claim 1 wherein said drive means rotates about an axis generally normal to the axis of rotation of said output means.

4. The motion reversing device as defined in claim 1 wherein said rotatable drive means is a gear, said rotation imparting means includes a shaft carrying a ratchet pawl for engaging teeth of said drive gear, and means for reciprocating said shaft to impart successive incremental movements to said drive gear.

5. The motion reversing device as defined in claim 1 wherein said rotatable drive means is a gear, said rotation imparting means includes a shaft carrying a ratchet pawl for engaging teeth of said drive gear, means for reciprocating said shaft to impart successive incremental movements to said drive gear, and said reciprocating means includes means coupled to said shaft which is movable in response to fluid pressure for reciprocating said shaft.

6. The motion reversing device as defined in claim 1 wherein said first and second means includes first and second gears drivably coupled to an output shaft and a rotatable drive gear drivably coupled to said rotatable drive means, and biasing means for biasing one of said first and second gears into engagement with said drive gear.

7. The motion reversing device as defined in claim 1 wherein said first and second means includes first and second gears drivably coupled to an output shaft of said output means and another gear intermediate said first and second gears and a drive gear of said rotatable drive means.

8. The motion reversing device as defined in claim 1 wherein said first and second means includes first and second gears drivably coupled to an output shaft of said output means and another gear intermediate said first and second gears and a drive gear of said rotatable drive means, and said first, second and other gears are bevel gears.

9. The motion reversing device as defined in claim 1 wherein said selective coupling means includes fluid motor means, said output means includes an output shaft and bell crank means operatively coupled between said fluid motor and said output shaft for reciprocating the latter for effecting said selective separate coupling.

10. The motion reversing device as defined in claim 1 wherein said rotatable drive means includes a rotatable drive gear, said first and second means include a pair of output gears and intermediate gear means between said drive gear and said pair of output gears, said output means is a rotatable output shaft, and means coupling said pair of output gears to said output shaft.

11. The motion reversing device as defined in claim 10 including means for biasing one of said pair of output gears into engagement with said intermediate gear means.

12. The motion reversing device as defined in claim 10 including a tubular housing rotatably supporting said rotatable drive gear, said selective coupling means includes a reciprocal piston in said housing, and bell crank means coupled between said piston and said output shaft for selectively reciprocating the latter.

13. The motion reversing device as defined in claim 10 including means for indicating the number of revolutions of said output shaft.

14. The motion reversing device as defined in claim 10 wherein said selective coupling means includes a sleeve carrying said pair of output gears, said output shaft being telescopically received in said sleeve, means coupling said sleeve and output shaft for simultaneous rotation, and means for axially reciprocating said sleeve relative to said output shaft for effecting said selective separate coupling.

References Cited
UNITED STATES PATENTS

| | | | |
|---|---|---|---|
| 345,490 | 7/1886 | Driver | 74—126X |
| 2,304,514 | 12/1942 | Sutton | 74—126 |
| 2,874,584 | 2/1959 | Ahlport | 74—319 |
| 2,964,957 | 12/1960 | Martin et al. | 74—126 |

ARTHUR T. McKEON, Primary Examiner

U.S. Cl. X.R.

74—89.13